Patented June 18, 1929.

1,717,905

UNITED STATES PATENT OFFICE.

JULIUS ALSBERG, OF NEW YORK, N. Y., ASSIGNOR TO THE SUPERHEATER COMPANY, OF NEW YORK, N. Y., A CORPORATION OF DELAWARE.

METHOD AND COMPOSITION FOR PREVENTING THE FORMATION OF SCALE.

No Drawing. Application filed August 14, 1924. Serial No. 731,968.

Scale consists as a rule, principally of a mixture of carbonates of lime and magnesium. These carbonates, in the form of minute crystals, result from a decomposition, under the influence of heat, of the bicarbonates of calcium and magnesium generally contained in water. Since the carbonates are much less soluble in water than the bicarbonates, they precipitate out and form scale. Numerous, so-called boiler compounds are in use, their object being to prevent foaming and to keep scale from being deposited on the heating surfaces of the boiler. No effort is made to prevent precipitation of the scale-forming matter, but the endeavor is simply to keep the precipitates in suspension in the body of the water, so that they will settle out as a sludge instead of adhering to the heating surfaces of the boiler. In contradistinction to the usual boiler compounds of the type just referred to, my improved method and composition have for their object to prevent completely the precipitation of any scale forming matter while the water, on its way to the boiler, passes through the feed water heater, that is to say through a closed vessel in which the water and the new composition are subjected to the influence of a relatively moderate heat, in other words, a heat below that prevailing in the boiler. I have found that this improved result of preventing completely the precipitation of the scale forming matter while the water is passing through the feed water heater, may be obtained by adding to the feed water, certain colloidal substances, and particularly materials containing a substantial proportion of tannin. The preferred substance employed by me is chestnut extract, a commercially known substance, which is made from the wood and the bark of the domestic chestnut tree (Castanea Vesca) or from either the wood alone or the bark alone. Different methods are employed for the commercial manufacture of this substance, the method by which it may be prepared is immaterial and forms no part of my invention. The substance can readily be purchased in the open market and is well known in the chemical trade under the name "chestnut extract".

The amount of the compound employed depends of course on the character of the water to be treated. In a particular case where the water contained rather less than the usual percentage of scale-forming material, I found one part of the above chestnut bark extract to one hundred thousand parts of water to be a satisfactory proportion. With water of greater impurity, the percentage of the compound would have to be increased.

The action of the chestnut extract is probably due to its colloidal character, which acts to keep the carbonates of lime and magnesium and other scale-forming matter in a colloidal state, in which they will not be precipitated It is believed that as carbonates of lime and magnesium are formed in the water, they are at first in the colloidal state and only subsequently assume the crystalline condition in which they are precipitated. The addition of the new compound keeps the said carbonates in the colloidal state and retards materially their conversion to the crystalline condition.

As the speed of the change of the soluble bicarbonates to the insoluble, forming crystalline precipitates, depends upon conditions of temperature and pressure, and, as heretofore pointed out, the feed water is first subjected to a moderate heat in the feed water heater, the scale forming materials are kept in the colloidal state for a sufficient time to enable the chestnut extract, which acts as a protective colloid, to prevent the formation in the feed water heater of crystalline carbonates which would otherwise precipitate and collect upon the heating surfaces thereof. While I am aware that many of the so-called boiler compounds employ tannin-containing substances, such compounds are used not for the purpose of entirely preventing precipitation of the scale-forming carbonates but either to bring about the precipitation in the form of a muddy sludge that will not adhere tenaciously to the heating surfaces of the boiler, or in a form, which if adherent, will be so porous in character that it will be substantially non-insulating and will therefore not interfere appreciably with the heat transference. The process herein disclosed differs from the use of such compounds in that I prevent the precipitation of the insoluble carbonates during the time the feed water is passing through the feed water heater, namely a closed vessel in which the water is subjected to a preliminary heating before it is passed to the boiler, the colloidal substance being added to the feed water before the water passes to the feed water heater. As the water passes through the feed water heater, the substance being in solution with the water passes continuously in very small quantities to the heater with the water and acts to absolutely prevent precipitation during the comparatively short period of time the water is subjected to the relatively moderate heating in the heater. As a result, deposit of scale upon the heating surfaces of the heater is entirely prevented. The method herein disclosed will therefore be seen to be quite distinct from the use of the commonly used boiler compounds which are periodically introduced, usually directly into the boiler, in relatively large quantities to bring about precipitation.

Instead of chestnut extract, I may use similar tanning materials, such as extracts of divi-divi, gambier, sumac, fustic, hemlock, larch, oak, and quebracho. The substance used should have colloidal properties and must be such that comparatively small proportions of it will suffice to produce the desired retardation of the precipitation. Of course, it should have no harmful action on the metal of which the boiler and the feed-water heater are made. Especial care should be taken to use the anti-precipitation agent alone, or at least without the addition of substances which will defeat its anti-precipitating action, in other words, without the addition of substances, such as, soda ash or trisodic phosphate which will produce or hasten precipitation.

The extracts of chestnut, divi-divi, gambier, sumac, fustic, hemlock, larch, oak, and quebracho all contain tannins and other colloidal materials. I do not however wish to restrict myself to the use of agents of a vegetable nature.

I claim:

1. The process of preventing precipitation from boiler feed water during the preheating of the water in its passage through a closed heater prior to its introduction into a boiler, of the soluble salts therein normally precipitable by heat, which consists in treating the cold feed water with colloidal chestnut extract, whereby the precipitation of the crystalline scale forming ingredients is retarded and does not occur until the water has been introduced into the boiler.

2. The process of preventing precipitation of scale forming carbonates from boiler feed water during the preheating of such water in its passage through a closed heater prior to its introduction into the boiler, of the soluble salts therein which are normally precipitable by heat, which consists in treating the cold feed water with a protective colloid containing substance which prevents the scale forming ingredients from leaving the colloidal state and thereby prevents precipitation of such ingredients while said water is being preheated.

3. The process of preventing precipitation from boiler feed water during the preheating of the water in its passage through a closed heater and prior to its introduction into a boiler, of the scale forming, soluble salts contained therein which are normally precipitable by heat, which consists in treating the cold feed water with a protective colloid of tannic nature which prevents the scale forming ingredients from leaving the colloidal state and thereby prevents precipitation of such ingredients while said water is being preheated.

In testimony whereof I have hereunto set my hand.

JULIUS ALSBERG.